UNITED STATES PATENT OFFICE.

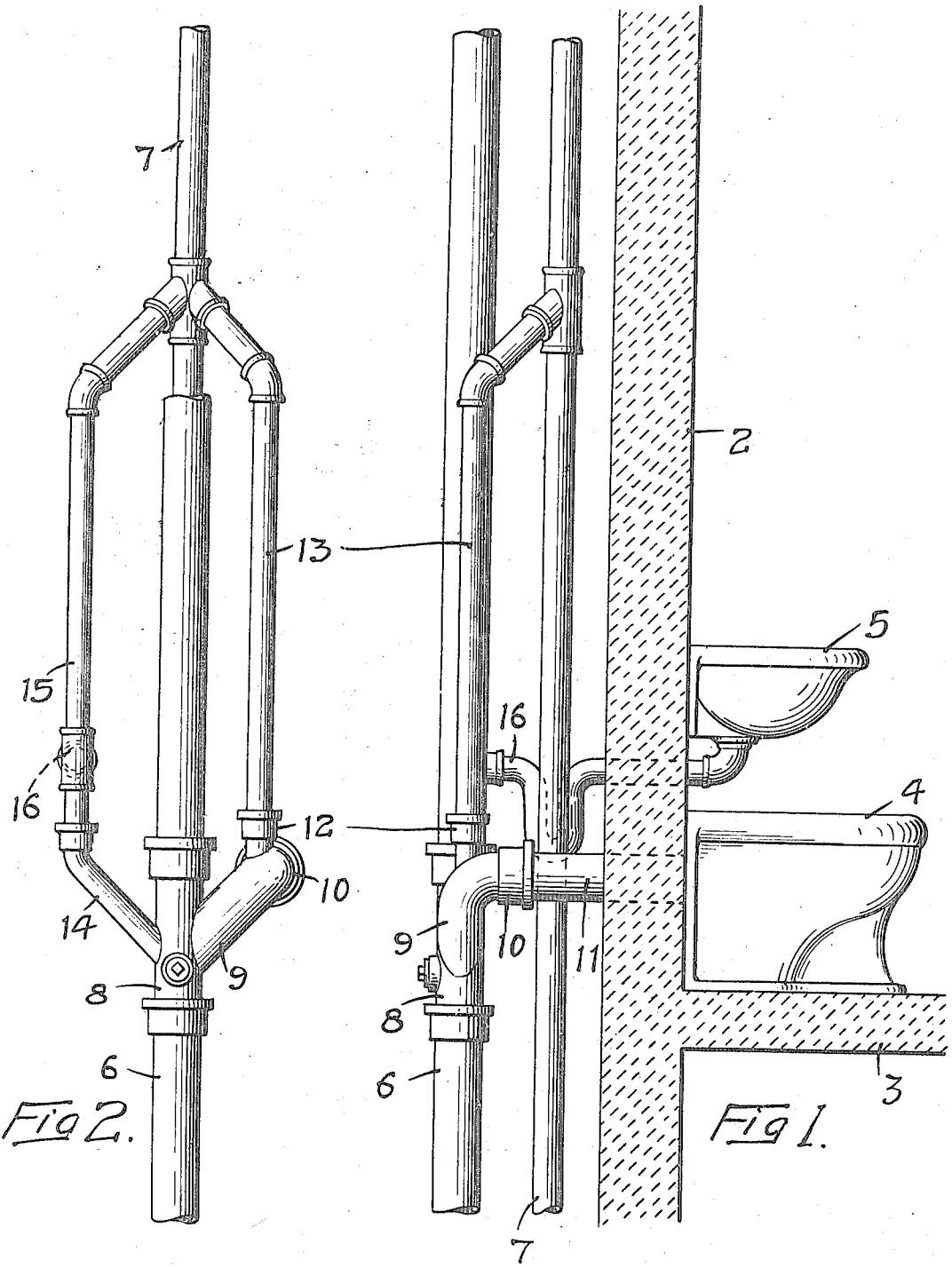

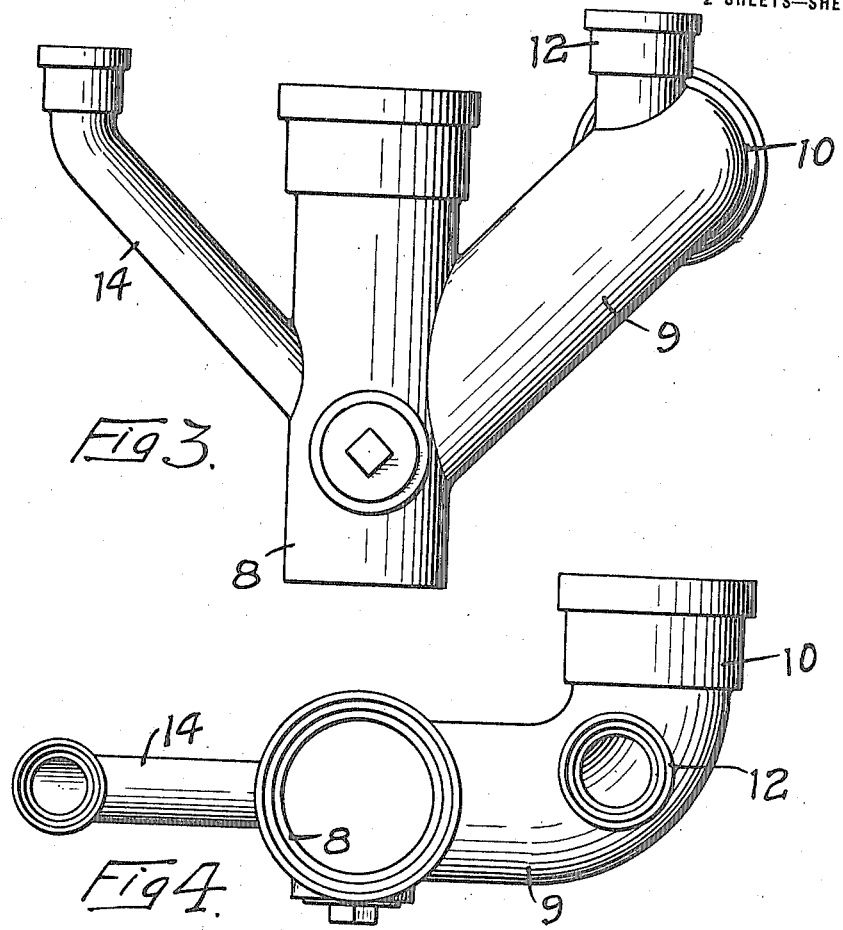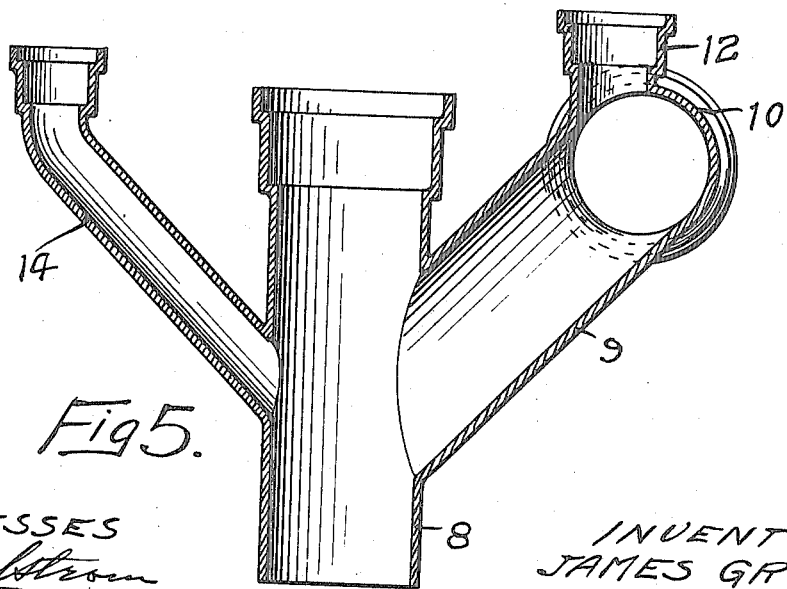

JAMES GRIGG, OF MINNEAPOLIS, MINNESOTA, ASSIGNOR TO HARRY P. WALLACE, OF MINNEAPOLIS, MINNESOTA.

WASTE AND REVENT FITTING.

1,145,679. Specification of Letters Patent. Patented July 6, 1915.

Application filed March 2, 1911. Serial No. 611,897.

*To all whom it may concern:*

Be it known that I, JAMES GRIGG, of Minneapolis, Hennepin county, Minnesota, have invented certain new and useful Improvements in Waste and Revent Fittings, of which the following is a specification.

The object of my invention is to provide a fitting of very compact form and adapted particularly for use where the space is very limited, such as in a prison cell, for making the necessary connections.

A further object of my invention is to effect an economy of joints,—a fitting combining several fittings in one casting.

A further object is to provide for increased rigidity of the soil stack, increasing the life of the plumbing and making leaky joints improbable and thereby insuring sanitary work.

A further object is to provide for re-venting close to the seals of the fixtures, thereby equalizing air pressure and causing a circulation of fresh air nearer to the fixtures than is possible in the ordinary system.

Further the invention consists in various constructions and combinations, all as hereinafter described and particularly pointed out in the claim.

In the accompanying drawing forming part of this specification, Figure 1 is a vertical sectional view through a partition and floor, illustrating the application of my invention to the toilet fixtures, Fig. 2 is a view showing the connection with the soil pipe and the vent pipes leading from the fitting to the pipe, Fig. 3 is a side view of the fitting, Fig. 4 is a top view, Fig. 5 is a vertical sectional view showing the construction of the fitting.

In the drawing, 2 represents a vertical partition, 3 a floor, 4 a seat fixture, and 5 a wash-bowl fixture.

6 is the soil pipe, arranged vertically near the partition wall, 7 is the vent, 8 is a section of the fitting inserted into the soil pipe in the usual way. This section is provided on one side with a branch 9 which extends upwardly and outwardly from the section 8 and terminates in a horizontal extension 10 to which the waste pipe 11 from the seat 4 is connected. This branch is also provided with a hub 12 for connection with a pipe 13 which leads to the vent pipe 7. On the other side of the fitting section is a similar branch pipe 14 from which a pipe 15 extends to the vent and to which the pipe 16, leading from the bowl 5, is connected. With this fitting the connections with the fixtures may be made in a very limited space and the device is hence particularly well adapted for use in prisons, where there is very little room for making the necessary plumbing connections. The joints are reduced to a minimum and hence the connection will be more economical and will require less attention. Furthermore, the vent connections are close to the seals of the fixtures, causing a circulation of fresh air nearer to the fixtures than usual in connections of this kind. Furthermore, the connection will brace and strengthen the soil stack and to a large extent prevent leaky joints.

I claim as my invention:—

The combination, with a soil stack, of a fitting inserted therein and comprising a pipe section and branch sections diverging therefrom, one of said branch sections having a horizontal extension for attachment with a seat fixture, the other branch section having means for connection with a bowl fixture, a vent pipe, and pipes leading from said branch pipes to said vent pipe.

In witness whereof, I have hereunto set my hand this 7th day of February 1911.

JAMES GRIGG.

Witnesses:
GENEVIEVE E. SORENSEN,
EDWARD A. PAUL.